US007778651B2

(12) United States Patent
Billhartz

(10) Patent No.: US 7,778,651 B2
(45) **Date of Patent: *Aug. 17, 2010**

(54) WIRELESS NETWORK RANGE ESTIMATION AND ASSOCIATED METHODS

(75) Inventor: Thomas Jay Billhartz, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 578 days.

This patent is subject to a terminal disclaimer.

(21) Appl. No.: 11/058,931

(22) Filed: Feb. 16, 2005

(65) Prior Publication Data

US 2006/0183488 A1 Aug. 17, 2006

(51) Int. Cl.
*H04W 24/00* (2009.01)

(52) U.S. Cl. .............. 455/456.5; 455/456.1; 455/456.2; 455/456.3

(58) Field of Classification Search .............. 455/456.5, 455/456.1, 456.2, 456.3, 414.2, 421, 440
See application file for complete search history.

(56) References Cited

U.S. PATENT DOCUMENTS 4,042,926 A * 8/1977 Anderson et al. ........... 342/173
5,526,357 A 6/1996 Jandrell ..................... 370/95.2
5,550,549 A 8/1996 Procter, Jr. et al. ............ 342/47
5,687,196 A 11/1997 Proctor, Jr. et al. .......... 375/347
5,706,010 A 1/1998 Franke ........................ 342/47
6,292,665 B1 9/2001 Hildebrand et al. ......... 455/456
6,587,514 B1 * 7/2003 Wright et al. ............... 375/296
7,046,987 B2 * 5/2006 Siegel et al. ............. 455/404.2
7,110,779 B2 * 9/2006 Billhartz et al. .......... 455/456.2
7,321,777 B2 * 1/2008 Billhartz et al. .......... 455/456.2
2002/0080759 A1 6/2002 Harrington et al. .......... 370/338
2002/0118655 A1 8/2002 Harrington et al. .......... 370/328
2003/0025602 A1 2/2003 Medema et al. .......... 340/568.1
2003/0034887 A1 2/2003 Crabtree et al. ............. 340/539
2003/0043073 A1 3/2003 Gray et al. .................. 342/465

* cited by examiner

*Primary Examiner*—Lester Kincaid
*Assistant Examiner*—Sayed T Zewari
(74) *Attorney, Agent, or Firm*—Allen, Dyer, Doppelt, Milbrath & Gilchrist, P.A.

(57) ABSTRACT

The wireless communications system includes a plurality of wireless communications devices, with each device type having a known latency profile associated therewith. A wireless device detector includes a controller for cooperating with a transceiver for transmitting a plurality of device finding signals to a target wireless communications device. The target wireless communications device transmits a respective reply signal for each of the device finding signals. Also, the controller generates an observed latency profile for the target wireless communications device based upon the transmission of device finding signals and the received reply signals therefor, determines a propagation delay based upon the observed latency profile and the known latency profile, and estimates a range to the target wireless communications device based upon the determined propagation delay.

24 Claims, 8 Drawing Sheets

100
101
105
104
106
$DS_1$ - $DS_n$
$RS_1$ - $RS_n$
103
109
102
1000 FT.
WIRELESS DEVICE DETECTOR

101

102
109
$RS_1$ - $RS_n$
$DS_1$ - $DS_n$
1000 FT.
WIRELESS DEVICE DETECTOR
104
105
103
106
100

WIRELESS NETWORK RANGE ESTIMATION AND ASSOCIATED METHODS

FIELD OF THE INVENTION

The present invention relates to the field of wireless communications systems, and, more particularly, to wireless location devices and related methods.

BACKGROUND OF THE INVENTION

Wireless location techniques are used in numerous applications. Perhaps the most basic of these applications is for locating lost articles. By way of example, published U.S. patent application no. 2003/0034887 to Crabtree et al. discloses a portable article locator system for locating lost articles such as glasses, keys, pets, television remotes, etc. More particularly, a wireless transceiver is attached to a person, animal, or other object. A handheld locator transmits a locator signal to the wireless transceiver which includes a unique address code of the transceiver. If the received code matches that stored by the wireless transceiver, it sends a return signal back to the locator device. The locator device uses the return signal to determine the distance and/or direction to the wireless transceiver from the user's location.

The locator device includes an antenna array which includes a plurality of omni-directional antennas. The locator unit determines the bearing to the wireless transceiver by switching between antennas in the antenna array and using Doppler processing to determine a direction of a wireless signal received from the transceiver. The distance to the wireless transmitter is also determined based upon the reception of the wireless signal at each of the antennas of the antenna array. Furthermore, in one embodiment, which is intended to avoid interference between two or more locators in a common area, a plurality of locator signals may be sent from a locator at a standard repetition rate. The locator's receiver then only listens for responses during predetermined windows following each transmission.

In contrast, in some applications it is desirable to determine the location of an unknown signal transmitter. U.S. Pat. No. 5,706,010 to Franke discloses such a system in which a transmitter locator receives a signal from the unknown signal transmitter and processes the signal to determine a bearing to the unknown signal transmitter. The transmitter locator then sends an interrogating signal to the unknown signal transmitter. Upon receiving the interrogating signal, the unknown signal transmitter heterodynes the interrogation signal with its own carrier signal to generate an intermodulation return signal. A processor of the transmitter locator measures the round-trip transit time from the transmission of the interrogation signal to the reception of the intermodulation return signal. A range to the unknown signal transmitter is then calculated based upon the round-trip transit time.

Still another application in which locating a wireless communications device is often necessary is in cellular telephone networks. That is, it may be necessary to locate particular cellular telephone users for law enforcement or emergency purposes, for example. U.S. Pat. No. 6,292,665 to Hildebrand et al., which is assigned to the present assignee, discloses a method for geolocating a cellular phone initiating a 911 call. A base station transceiver transmits a supervisory audio tone (SAT), which is automatically looped back by the calling cellular phone. Returned SAT signals are correlated with those transmitted to determine the range of the cellular phone. In addition, incoming signals from the cellular phone, such as the returned SAT signals, are received by a phased array antenna and subjected to angle of arrival processing to determine the direction of the cellular phone relative to the base station. The cellular phone is geolocated based upon the angle of arrival and the range information. A correction factor provided by the manufacturer of a given cellular telephone is used to account for the loopback path delay through the phone.

One additional area in which wireless device location can be important is in wireless networks, such as wireless local area networks (WLANs) or wide area networks (WANs), for example. A typical prior art approach to locating terminals within a WLAN includes locating a plurality of receivers at fixed locations within a building, for example, and then determining (i.e., triangulating) the position of a terminal based upon a signal received therefrom at each of the receivers.

Another prior art approach for wireless terminal location is to use a direction finding (DF) device which includes a directional antenna for receiving signals when pointed in the direction of a transmitting node. An example of a portable DF device for WLANs is the Yellowjacket 802.11a wi-fi analysis system from Berkeley Varitronics. This device uses a passive DF technique, i.e., it does not solicit any signals from a terminal but instead waits for the terminal to transmit signals before it can determine the direction of the transmission. Determination of range to the terminal is not provided by this device.

Despite the advantages of such prior art wireless communications device locators, additional wireless location features may be desirable in various applications.

SUMMARY OF THE INVENTION

In view of the foregoing background, it is therefore an object of the present invention to provide a wireless communications device detector which provides enhanced range estimation features and related methods.

This and other objects, features, and advantages in accordance with the present invention are provided by a wireless communications system including a plurality of wireless communications devices, such as wireless local area network (WLAN) devices, mobile ad-hoc network (MANET) devices and/or cellular communications devices, each having a device type associated therewith from among a plurality of different device types, and each device type having a known latency profile associated therewith.

A wireless device detector includes at least one antenna and a transceiver connected thereto, and a controller for cooperating with the transceiver for transmitting a plurality of device finding signals to a target wireless communications device from among the plurality of wireless communications devices. The target wireless communications device transmits a respective reply signal for each of the device finding signals.

Also, the controller of the wireless device locator cooperates with the transceiver for receiving the reply signals, generating an observed latency profile for the target wireless communications device based upon the transmission of device finding signals and the received reply signals therefor, determining a propagation delay associated with the target wireless communications device based upon the observed latency profile and the known latency profile of the target wireless communications device, and estimating a range to the target wireless communications device based upon the determined propagation delay.

In other words, the wireless device detector advantageously provides active range finding. The known latency profile and the observed latency profile of each device are preferably histograms including a peak and/or a characteristic shape or signature, and the controller determines the propagation delay based upon a comparison of the respective histogram peaks and/or histogram shape.

Each wireless communications device may have a unique identifier (UID) associated therewith, wherein the controller inserts the UID for the target wireless communications device in each of the device finding signals, and the target wireless communications device generates respective reply signals based upon the UID in the device finding signals. The target wireless communications device may generate unsolicited signals including the UID thereof, wherein the controller cooperates with the transceiver to receive at least one unsolicited signal from the target device, and the controller determines the UID for the target wireless communications device from the at least one unsolicited signal. The controller may determine the device type of the target wireless communications device based upon the UID thereof. The UIDs may comprise media access control (MAC) addresses of respective wireless communications devices, and the controller determines the device type of the target wireless communications device based upon the MAC address thereof.

The wireless device detector may further include a profile database for storing respective known latency profiles associated with each of the plurality of different device types, and the controller may determine the device type of the target wireless communications device based upon the observed latency profile. The wireless device detector may include a portable housing carrying the at least one antenna, the transceiver, and the controller.

A method aspect of the invention is for detecting a target wireless communications device, such as a wireless local area network (WLAN) device, mobile ad-hoc network (MANET) device and/or cellular communications device, from among a plurality of wireless communications devices, with each wireless communications device having a device type associated therewith from among a plurality of different device types, and each device type having a known latency profile associated therewith. The method includes transmitting a plurality of device finding signals to the target wireless communications device, and receiving a respective reply signal for each of the device finding signals therefrom. An observed latency profile is generated for the target wireless communications device based upon the transmission of device finding signals and the received reply signals therefor, and a propagation delay associated with the target wireless communications device is determined based upon the observed latency profile and a known latency profile of the target wireless communications device. A range to the target wireless communications device is estimated based upon the determined propagation delay.

The known latency profile and the observed latency profile preferably comprise histograms including a peak and/or a characteristic shape or signature, and the propagation delay is determined based upon a mathematical comparison of the respective peaks and/or a characteristic shapes or signatures. The method may include storing respective known latency profiles associated with the plurality of different device types, and determining the device type of the target wireless communications device based upon the observed latency profile.

DETAILED DESCRIPTION OF THE PREFERRED EMBODIMENTS

Figure 1:
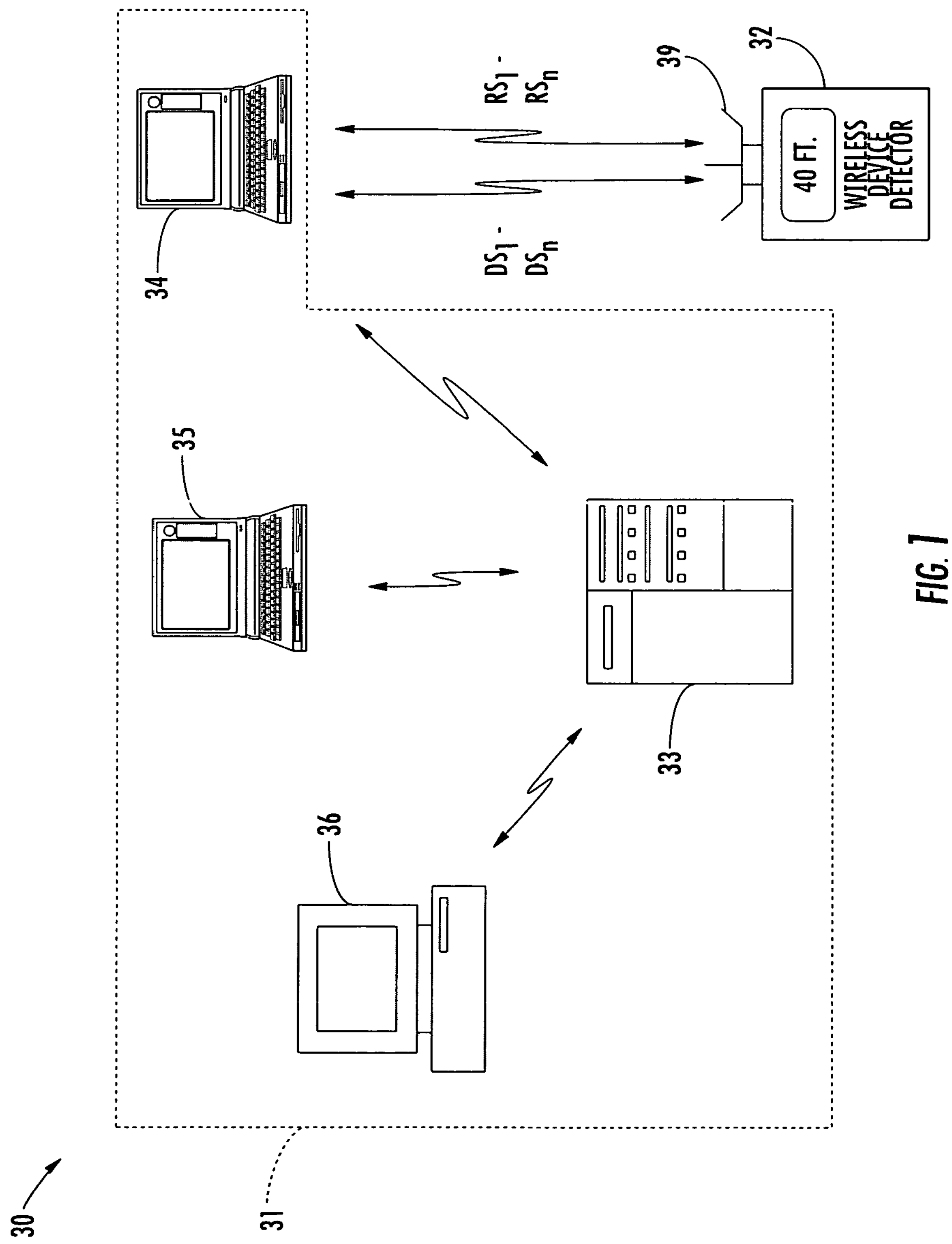
FIG. 1 is schematic block diagram of a wireless communications system in accordance with the present invention including a wireless local area network (WLAN) and wireless device detector for locating WLAN devices thereof.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

As will be appreciated by those skilled in the art, portions of the present invention may be embodied as a method, data processing system, or computer program product. Accordingly, these portions of the present invention may take the form of an entirely hardware embodiment, an entirely software embodiment, or an embodiment combining software and hardware aspects. Furthermore, portions of the present invention may be a computer program product on a computer-usable storage medium having computer readable program code on the medium. Any suitable computer readable medium may be utilized including, but not limited to, static and dynamic storage devices, hard disks, optical storage devices, and magnetic storage devices.

The present invention is described below with reference to flowchart illustrations of methods, systems, and computer program products according to an embodiment of the invention. It will be understood that blocks of the illustrations, and combinations of blocks in the illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions specified in the block or blocks.

These computer program instructions may also be stored in a computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer or other programmable apparatus implemented process such that the instructions which execute on the computer or other programmable apparatus provide steps for implementing the functions specified in the flowchart block or blocks.

The present invention may make use of the wireless device locator and methods, as described in copending application Ser. No. 10/767,794, filed Jan. 29, 2004 by the same assignee of record and incorporated by reference herein in its entirety.

Figure 2:
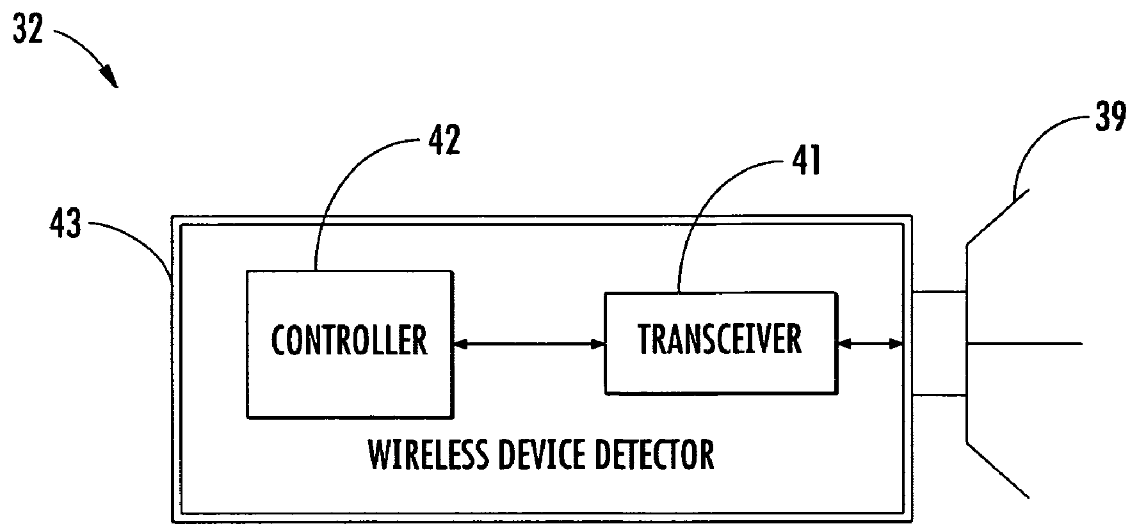
FIG. 2 is a schematic block diagram generally illustrating the components of the wireless device detector of FIG. 1.

Referring initially to FIGS. 1 and 2, a wireless communications system 30 illustratively includes a wireless local area network (WLAN) 31 and a wireless device detector 32. The WLAN 31 illustratively includes an access point 33 (e.g., a server) and a plurality of WLAN devices or terminals which communicate therewith wirelessly, such as the laptop computers 34, 35, and the desktop computer 36. Various WLAN protocols may be used in accordance with the present invention for such wireless communications (e.g., IEEE 802.11, Bluetooth, etc.), as will be appreciated by those of skill in the art. Moreover, it will also be appreciated that additional access points and/or other numbers of wireless communications devices may be used, even though only a few number thereof are shown for clarity of illustration. Further, numerous other types of WLAN enabled wireless communications devices (e.g., personal data assistants, etc.) may also be used, as will be further appreciated by those skilled in the art.

Each wireless communications device 34-36 in the WLAN 31 has a device type associated therewith from among a plurality of different device types. More particularly, the device type may signify the particular manufacturer and/or model of a given WLAN card or chip set used therein. In some embodiments, it may also signify the standard the device complies with (e.g., IEEE 802.11).

The device type is important in that different device types will have known device latencies patterns associated therewith. For example, different WLAN cards or chip sets will have a certain latency associated with the time they take to process a received signal and generate an acknowledgement reply thereto. These delay times may be fairly consistent across different models from a same manufacturer. Additionally, WLAN protocols such as IEEE 802.11 have a specified Short InterFrame Spacing (SIFS) associated therewith, e.g. 10 μs as will be appreciated by those skilled in the art. More specifically, IEEE 802.11 protocol requires an Acknowledgement (Ack signal) to be issued by the MAC after a SIFS of 10 μs. In practice, such delay may vary by as much as 0.5 μs. The latency of a given WLAN card is chip set dependent and takes on discrete values, likely related to the MAC processor (often which is from the ARM family) and/or hardware implementation. Thus, a given WLAN card will have an Acknowledgement response time that varies over range of values. If a histogram of response time for numerous Acknowledgements is created for a given type of WLAN card, it will show a characteristic shape, or signature. This histogram, or latency profile, will be observed whenever the WLAN card is actively solicited with data packets that cause an Acknowledgement. Though the shape of the histogram is invariant to the distance between the wireless device detector and the target WLAN card, the amount that it is shifted in time (as compared to a known reference histogram) is proportional to the round trip propagation delay between the wireless device detector and the target WLAN card.

The wireless device detector 32 illustratively includes an antenna 39 and a transceiver 41 connected thereto, as well as a controller 42 connected to the transceiver. These components may conveniently be carried by a portable housing 43 in some embodiments, although they could be implemented in a more stationary embodiment, if desired. In the illustrated example, the antenna 39 is a directional antenna, although omni-directional antennas may also be used, as will be appreciated by those skilled in the art. It will also be appreciated that various antenna/transceiver combinations may be used.

Figure 3:
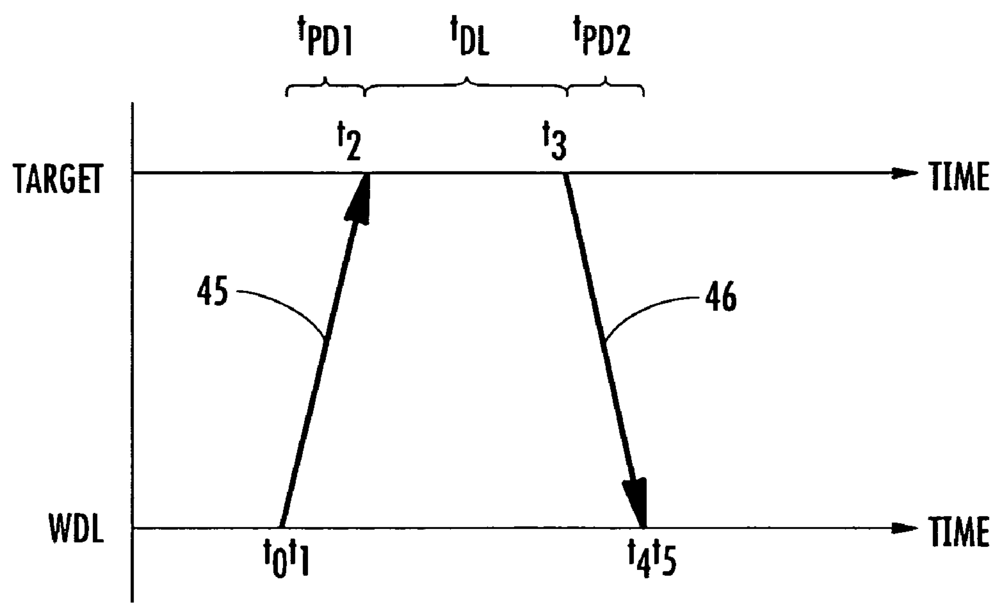
FIG. 3 is a graph illustrating the signal propagation delay and device latency components used by the controller of FIG. 2 to generate observed latency profiles.

Operation of the wireless device detector 32 will now be described with reference to FIG. 3. The controller 42 cooperates with the transceiver 41 for transmitting a plurality of device finding signals to a target wireless communications device to be located from among the plurality of wireless communications devices. In the present example, the laptop 34 is the target device.

As will be appreciated by those skilled in the art, each WLAN device 34-36 in the network 31 will have a unique identifier (UID) associated therewith which is used in signals transmitted between the respective devices and the access point 33. The UID distinguishes the devices 34-36 from one another so that each device only acts upon or responds to signals intended for it, and so the access point 33 knows which device it is receiving signals from.

Depending upon a given implementation, the wireless device detector 32 may or may not know the UID of the target device 34 before hand. For example, in some embodiments the wireless device detector 32 could download the UID from the access point 33 (either wirelessly or over a wired network connection, for example). This may be the case when trying to locate a node in a LAN where the node is already registered with the network. However, if the UID is not known, the wireless device detector 32 may passively listen to the target device 34 for unsolicited signals being transmitted therefrom. This feature may be advantageous for law enforcement applications, or for locating an interfering node that is not registered with a particular network but causes interference therewith, for example. By "unsolicited" signals it is meant that these signals are not solicited by the wireless device locator 32 itself, although such signals may have been solicited from another source (e.g., the access point 33).

The controller 42 cooperates with the transceiver 41 to receive one or more of the unsolicited signals, and the controller determines the UID for the target device 34 therefrom. Of course, the method by which the controller 42 determines the UID from the unsolicited signal will depend upon the given implementation, and whether or to what degree such signals are encrypted.

Additionally, the controller 42 may also determine the device type of the target wireless communications device 34 based upon the UID thereof. By way of example, the UIDs may include media access control (MAC) addresses of respective wireless communications devices. The MAC addresses may be specific to a particular type of device manufacturer, or indicate a particular operational protocol with which the device is operating, as will be appreciated by those skilled in the art. Accordingly, the controller may determine the device type of the target wireless communications device 34 based upon the MAC address thereof in some applications.

As such, to detect the target device 34, the controller inserts the UID therefor in each of the device finding signals. By way of example, the location finding signal may include the UID of the target device 34 in the header of valid packet that has no payload. This will force the target device 34 to generate a reply signal acknowledging receipt of the location finding signal (i.e., an ACK signal). Of course, various other location finding signals could be used to cause the target terminal 34 to generate an ACK signal, as will be appreciated by those skilled in the art. The controller 42 cooperates with the transceiver 41 for receiving the reply signals from the target device 34 via the antenna 39. The device finding signals and reply signals may be radio frequency (RF), microwave, optical, or other suitable types of signals, as will be appreciated by those skilled in the art.

The controller 42 generates an observed latency profile, as described in detail below, for the target device 34 based upon the device finding signals and reply signals. The controller 42 determines the propagation delay associated with the target device 34 based upon the observed latency profile and a known latency profile for such device type. The controller 42 uses this propagation delay to estimate a range to the target device 34. However, the propagation delay is preferably determined based upon a comparison (e.g. the lag of the maximum peak of the cross-correlation of the known latency profile and the observed latency histogram) of latency histograms, observed and known, of delays with respect to the target device 34.

The total round trip time will include several components. Referring more particularly to FIG. 3, the first component is the time associated with transmitting a device finding signal 45, which is illustrated with an arrow. That is, this is the time from the beginning of the device finding signal transmission (time $t_0$) to end thereof (time $t_1$). Two time axes are shown in FIG. 3. The top or upper axis represents events that occur at the target device 34, while the bottom or lower axis represents events that occur at the wireless device locator 32.

The second component of the round trip time is the propagation delay or time $t_{PD1}$ it takes for the device finding signal 45 to travel from the wireless device detector 32 to the target device 34 (i.e., from time $t_1$ to $t_2$). The third component of the round trip time is the device latency $t_{DL}$ of the target device 34 (i.e., from time $t_2$ to $t_3$). This is the time it takes the target device 34 to receive, process, and transmit a reply signal 46 or ACK signal, responsive to the device finding signal 45. The final components of the round trip time are propagation delay $t_{PD2}$ of the reply signal 46 (i.e., from time $t_3$ to $t_4$), and the reception time thereof by the wireless device detector 32 (i.e., from time $t_4$ to $t_5$).

The controller 42 will know the times associated with the transmission of the device finding signal 45 (i.e., from time $t_0$ to $t_1$), as well as the time associated with the reception of the reply signal 46 (i.e., from time $t_4$ to $t_5$) for each round trip, since these can be readily measured by the controller. The quantities that the controller 42 will not know are the propagation delays $t_{PD1}$, $t_{PD2}$ and the actual device latency $t_{DL}$.

Yet, as noted above, the controller 42 will have access to the known device latency (e.g., a latency histogram) for the given device type of the target device 34, which provides a profile of the actual device latency $t_{DL}$ that has been determined at a known reference distance. The known device latency could be a measured value based upon collected data, it could be provided by manufacturers, or it could be based upon a value set in a communications standard, as discussed above, for example.

As will be appreciated by those skilled in the art, the actual device latency will likely vary somewhat from one transmission to the next for any wireless communications device, potentially by as little as a few nanoseconds to a few microseconds, depending upon device configurations, processing loads, etc. As noted above, device latencies tend to vary from one transmission to the next. Since the location finding signals and reply signals are traveling at the speed of light, such variances can make a significant difference in the estimated distances. More particularly, light travels approximately 1000 ft. in one microsecond. Thus, if the device latency varies by one microsecond from one transmission to the next, the estimated distance to the target device 34 would similarly vary by 1000 ft. or so, which likely will be an unacceptable accuracy for many applications.

In accordance with the present invention, the controller 42 advantageously generates an observed latency profile or histogram which is a compilation of data including a plurality of observed device latencies that are compared with a known latency profile or histogram with respect to known device latencies to estimate the range to the target device 34. In other words, the propagation delay is not solely based upon a single measured propagation delay, but rather upon a plurality thereof. More particularly, by estimating the range based upon a histogram of a plurality of propagation delays, the wireless device detector 32 mitigates the effects of the variations in the actual device latency time. This provides a significantly more accurate approximation of the device latency time and, thus, a more accurate range estimation. By way of example, the controller 42 may estimate the range based upon a comparison of the lag of the maximum peak of the cross-correlation of the observed latency histogram and the known latency histogram.

Figure 4:
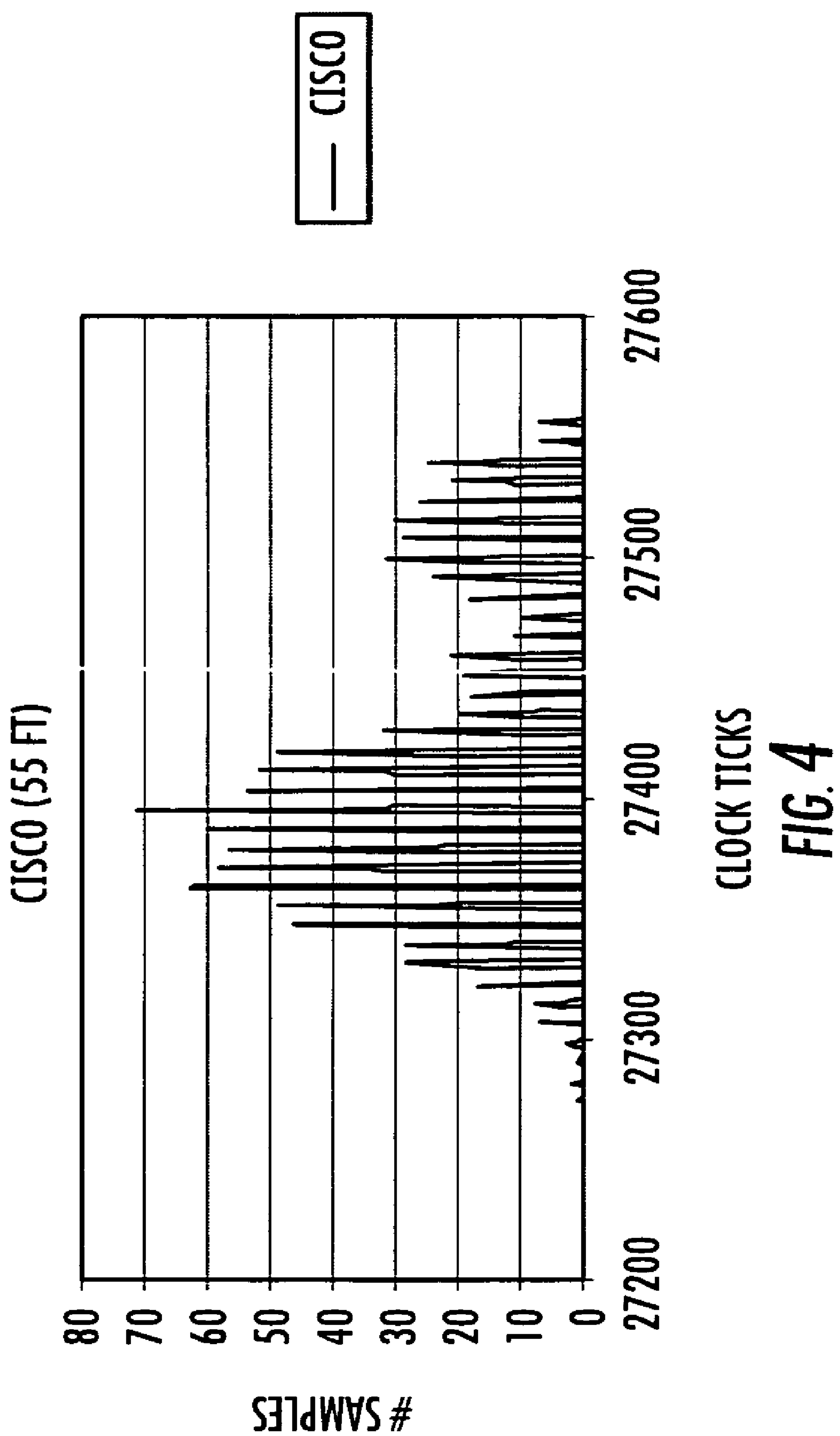
FIGS. 4-6 are histograms illustrating stored latency profiles used to determine propagation delay and range estimation by the wireless device detector of FIG. 2.
Figure 5:
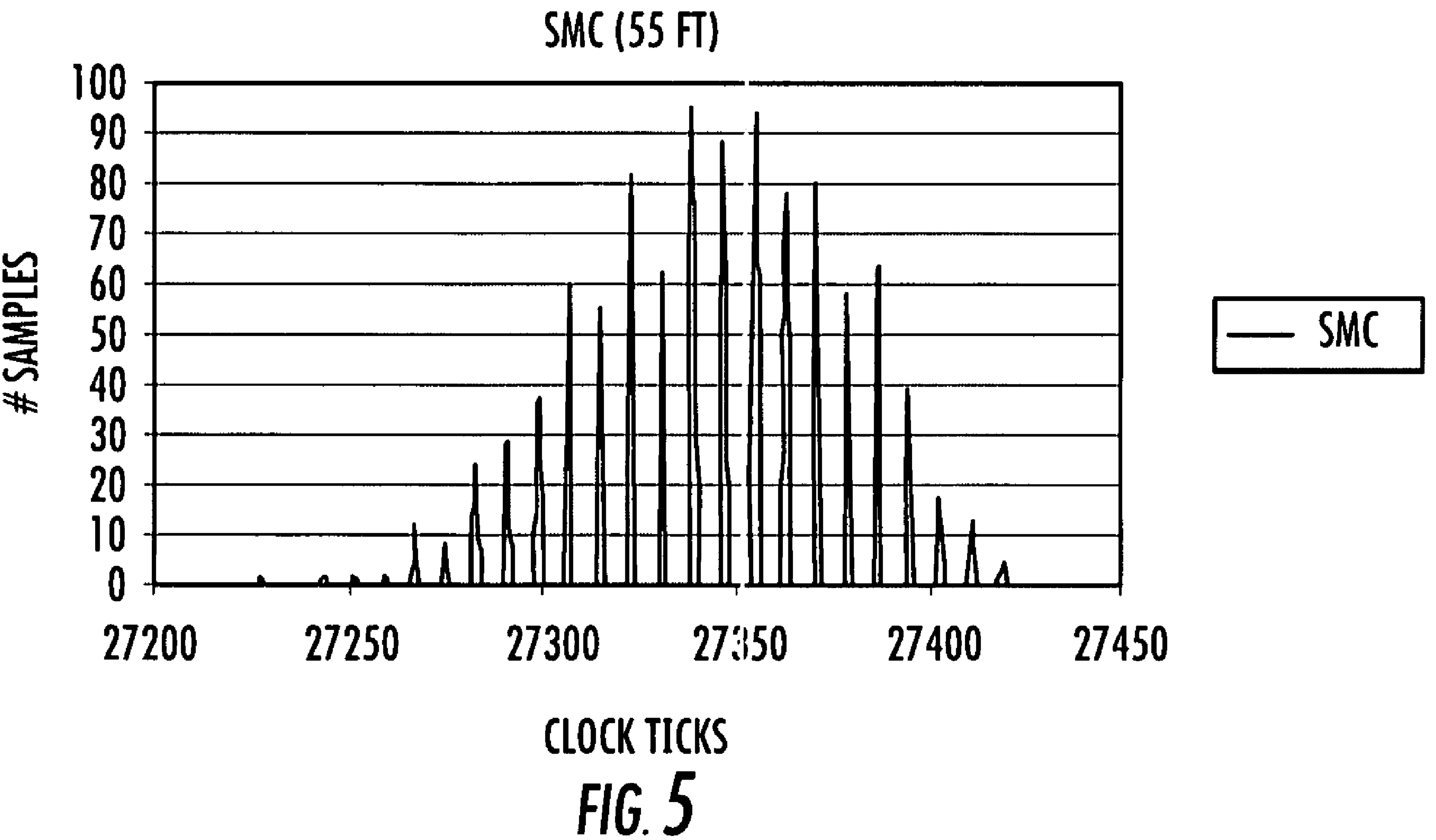
Figure 6:
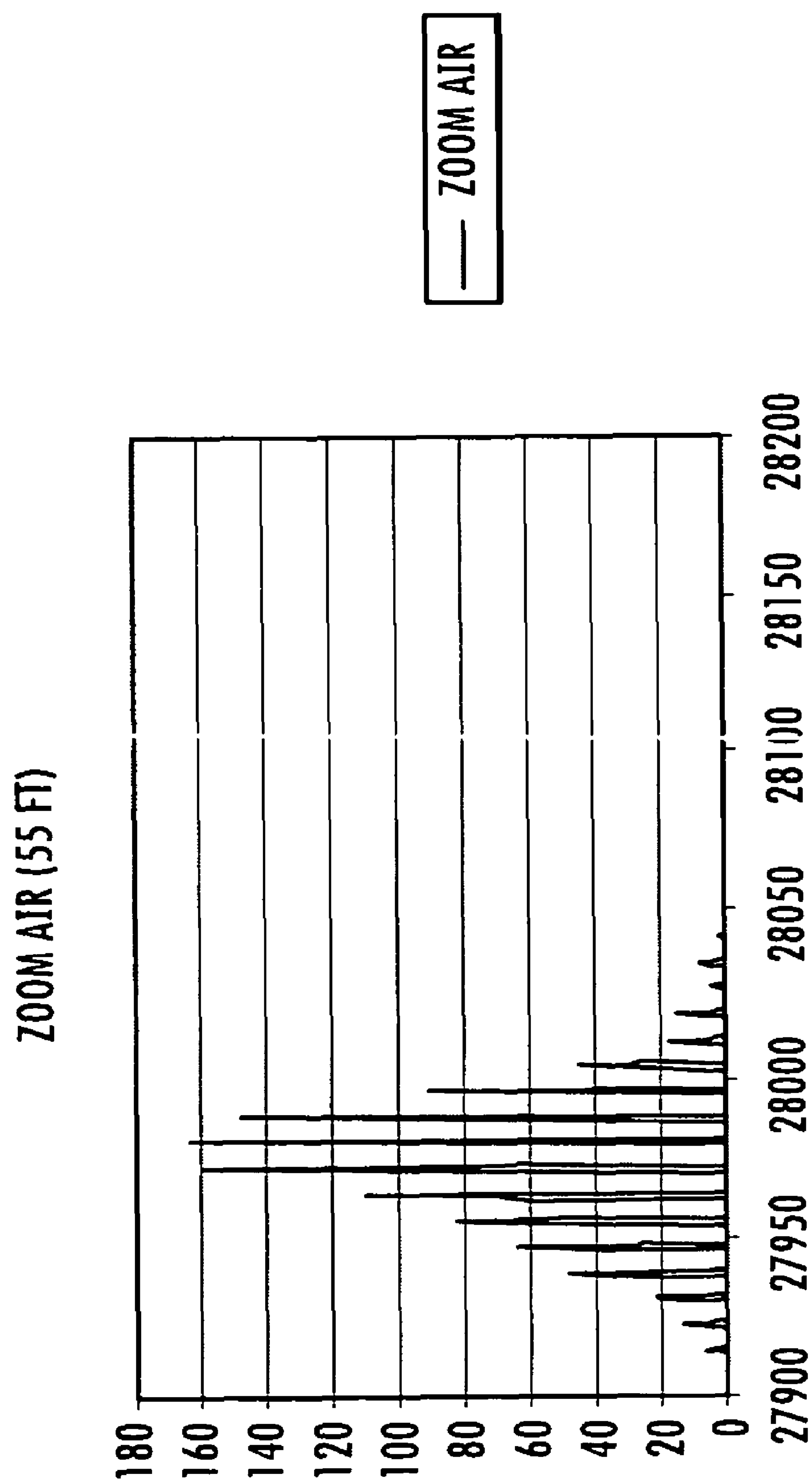

Referring now to FIGS. 4-6, a test was conducted in accordance with the present invention in which approximately 1500 location finding signals were transmitted to various stationary wireless IEEE 802.11 devices. The time it took to receive the reply signal was measured by ticks of an internal clock of the controller 42, where each tick represents 7.567 ns. From FIG. 4 it may be seen that the reply signals from the target "Cisco" device were returned within between about 27,300 and 27,550 clock ticks, where the transmission of the respective location signals each began at 0 clock ticks. Similarly, FIGS. 5 and 6 represent the measurements of reply signals from target devices such as an "SMC" device and "ZoomAir" device, respectively. These histograms may be stored in a database in the controller 42 to be used in the comparison with the observed profiles or histograms, as discussed above.

Figure 7:
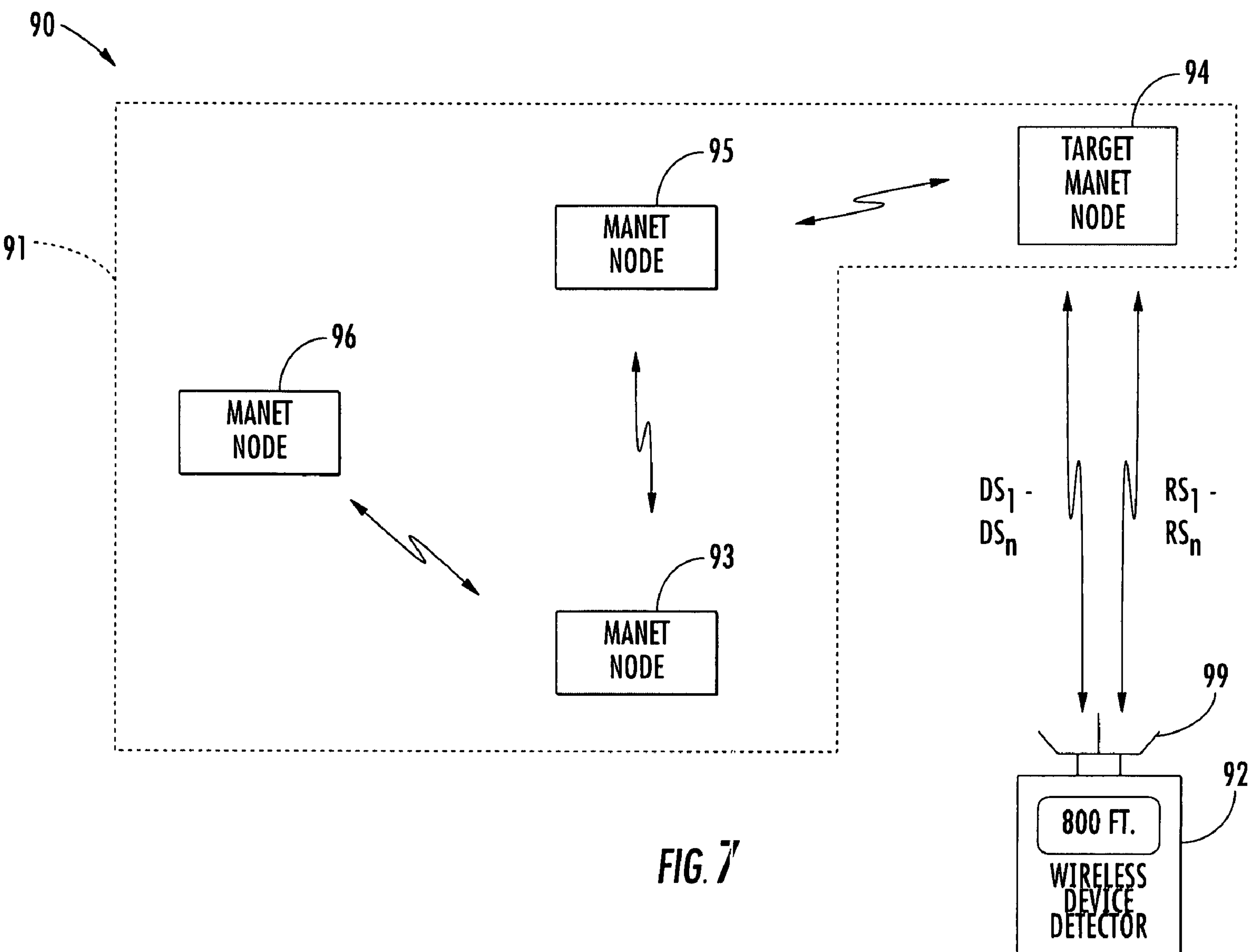
FIGS. 7 and 8 are schematic block diagrams illustrating alternate embodiments of the wireless communications system of FIG. 1 including a mobile ad-hoc network (MANET) and a cellular network, respectively.

While the present invention has been described above with reference to a WLAN wireless device detector 32, it will be appreciated by those skilled in the art that it may also be used in other wireless communications systems with other types of wireless communications devices. Referring more particularly to FIG. 7, a mobile ad-hoc network (MANET) system 90 illustratively includes a wireless device locator 92 including an antenna 99, such as those described above, and a MANET 91. More particularly, the MANET includes MANET nodes or devices 93-96, of which the node 94 is the target node in the illustrated example. Here, the wireless device detector 92 performs range estimation in the same manner described above, except that it will operate in accordance with the appropriate MANET protocol used within the system 90, as will be appreciated by those skilled in the art.

Figure 8:
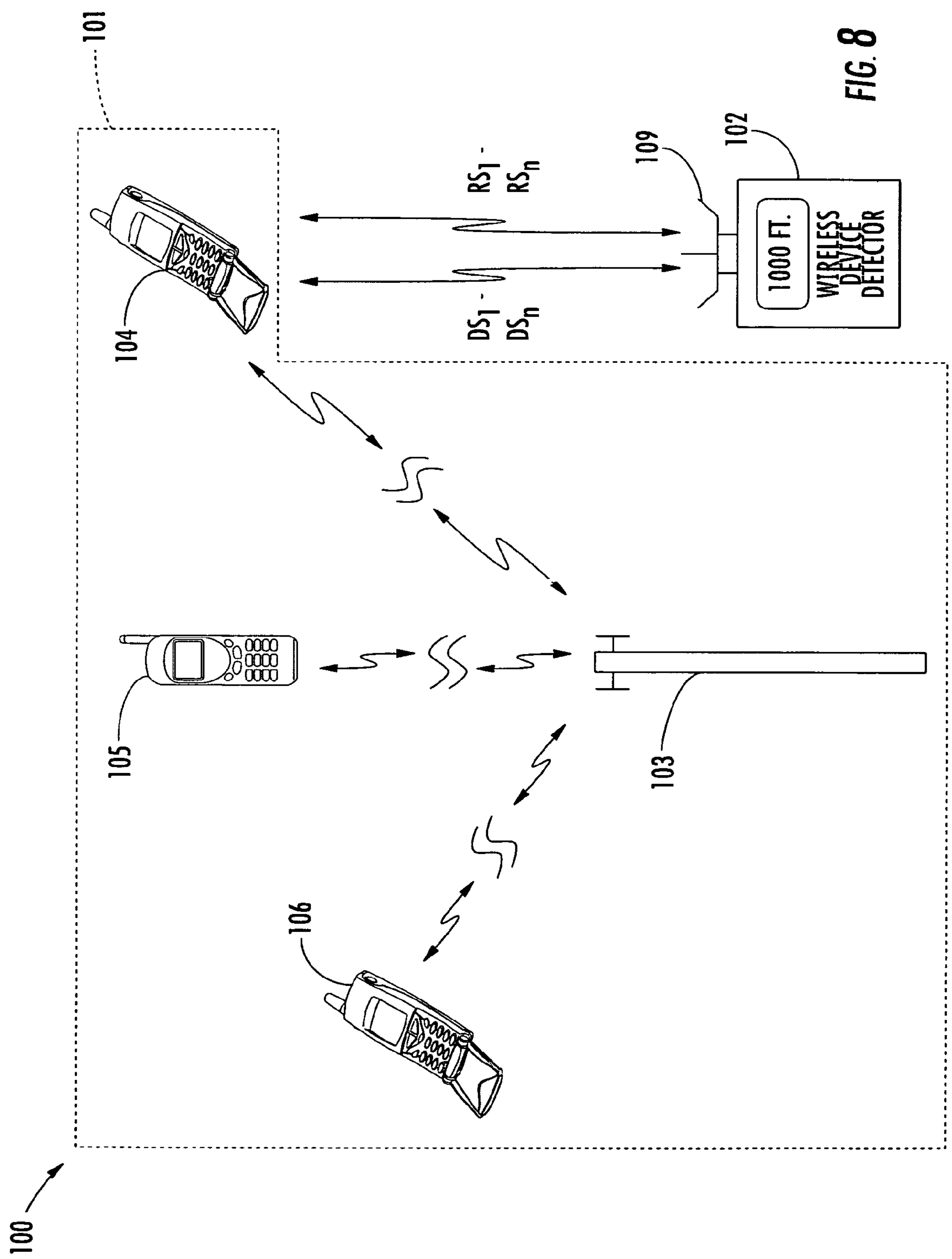

Another embodiment is illustrated in FIG. 8, in which a wireless device detector 102 having an antenna 109 is used within a cellular communications system 100 for locating cellular devices (e.g., cellular telephones) 104-106 in cellular network 101. The cellular devices 104-106 place and receive calls via a cellar tower 103, as will be appreciated by those skilled in the art. In the illustrated example, the target device is the cell phone 104. Here again, the wireless device detector 102 will communicate using the appropriate operating protocol being used in the cellular network 101 (e.g., code-division multiple access (CDMA), GSM, etc.), as will be appreciated by those skilled in the art.

Figure 9:
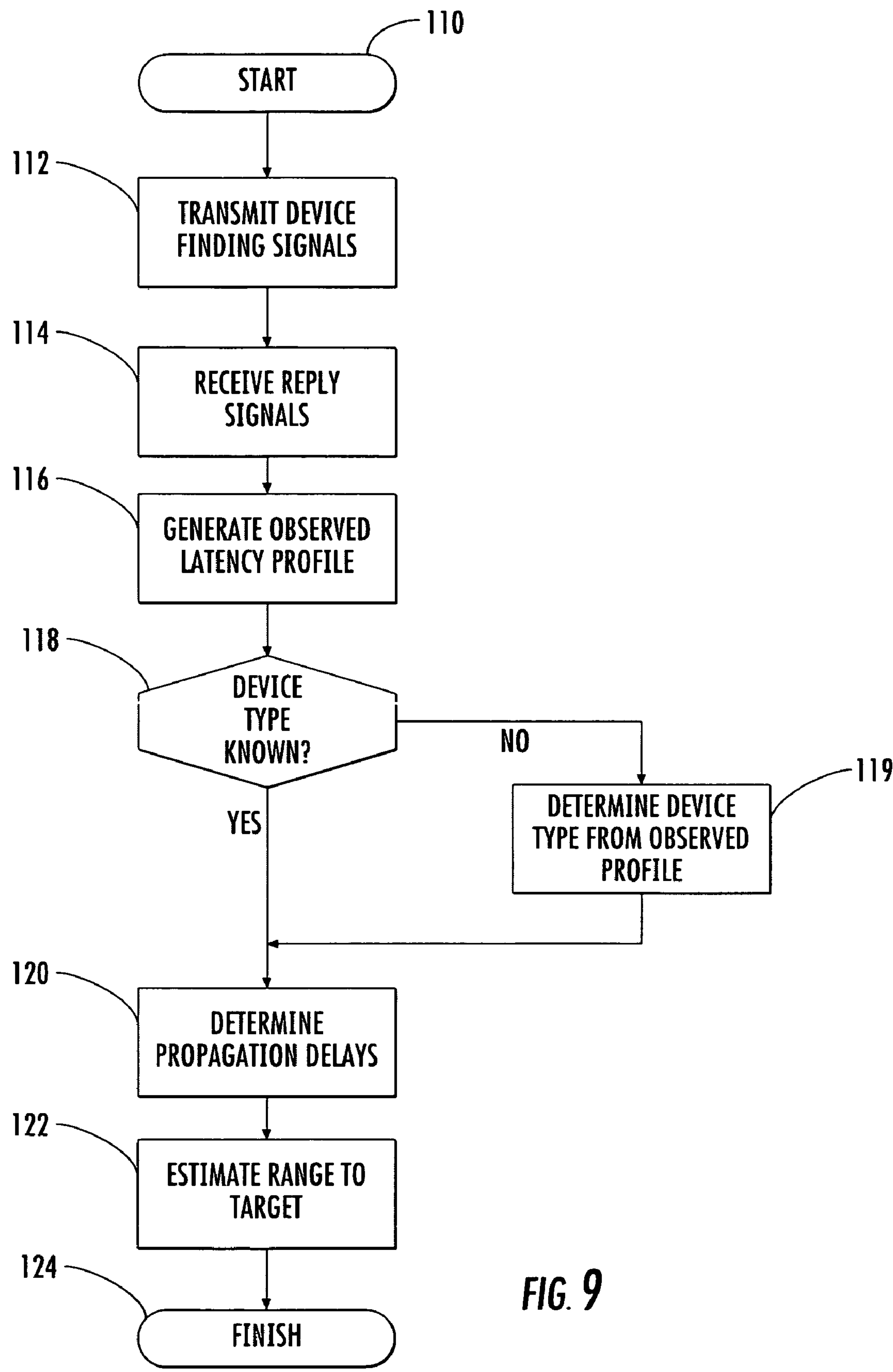
FIG. 9 is a flow diagram illustrating a wireless device range detection method in accordance with the present invention.

Turning now additionally to FIG. 9, a method aspect of the invention is for detecting the range of a target wireless communications 34 device from among a plurality of wireless communications devices 34-36. Beginning at Block 110, device finding signals are transmitted to the target wireless communications device, at Block 112, and respective reply signals for each of the device finding signals are received therefrom, at Block 114. Based thereon, an observed latency profile is generated at Block 116. If the device type (and, thus, the known latency profile) are known, at Block 118, then the propagation delay associated with the transmission of each device finding signal and the respective reply signal therefor is determined based upon the known latency profile of the target wireless communications device 34, at Block 120. As such, a range to the target wireless communications device 34 is estimated based upon the determined propagation delay (Block 122), as previously discussed above, thus concluding the illustrated method (Block 124).

Of course, if the device type is unknown, the controller 42 may determine the device type from the reply signal, as discussed above, or by comparing the observed profile or histogram with known profiles stored in a database (Block 119) or other suitable methods which will be appreciated by those skilled in the art. It should be noted that while this step is shown as occurring after the receipt of the reply signals in the illustrated example, the device type determination may be performed prior thereto, such as while determining the UID, for example.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless communications system comprising:

a plurality of wireless communications devices, each wireless communications device having a device type associated therewith from among a plurality of different device types and having a unique identifier (UID) associated therewith, and each device type having a known latency profile associated therewith; and a wireless device detector comprising at least one antenna and a transceiver connected thereto, and a controller for cooperating with said transceiver for transmitting a plurality of device finding signals to a target wireless communications device from among said plurality of wireless communications devices and for inserting the UID for said target wireless communications device in each of said device finding signals;

said target wireless communications device transmitting a respective reply signal for each of said device finding signals based upon the UID in the device finding signals;

said controller of said wireless device detector also for cooperating with said transceiver for receiving the reply signals, generating an observed latency profile for said target wireless communications device based upon the transmission of device finding signals and the received reply signals therefor, determining a propagation delay associated with said target wireless communications device based upon the observed latency profile and the known latency profile of said target wireless communications device, and estimating a range to said target wireless communications device based upon the determined propagation delay.

2. The wireless communications system of claim 1 wherein the known latency profile and the observed latency profile of each device comprise histograms; and wherein said controller determines the propagation delay based upon a mathematical cross-correlation of the respective histograms.

3. The wireless communications system of claim 1 wherein said target wireless communications device generates unsolicited signals including the UID thereof; wherein said controller cooperates with said transceiver to receive at least one unsolicited signal from said target device; and wherein said controller determines the UID for said target wireless communications device from the at least one unsolicited signal.

4. The wireless communications system of claim 3 wherein said controller determines the device type of said target wireless communications device based upon the UID thereof.

5. The wireless communications system of claim 4 wherein the UIDs comprise media access control (MAC) addresses of respective wireless communications devices, and wherein said controller determines the device type of said target wireless communications device based upon the MAC address thereof.

6. The wireless communications system of claim 1 wherein the wireless device detector further comprises a profile database for storing respective known latency profiles associated with each of the plurality of different device types.

7. The wireless communications system of claim 1 wherein said controller determines the device type of the target wireless communications device based upon the observed latency profile.

8. The wireless communications system of claim 7 wherein the wireless device detector further comprises a profile database for storing respective known latency profiles associated with each of the plurality of different device types.

9. The wireless communications system of claim 1 wherein said wireless device detector further comprises a portable housing carrying said at least one antenna, said transceiver, and said controller.

10. The wireless communications system of claim 1 wherein said wireless communications devices comprise wireless local area network (WLAN) devices.

11. The wireless communications system of claim 1 wherein said wireless communications devices comprise mobile ad-hoc network (MANET) devices.

12. The wireless communications system of claim 1 wherein said wireless communications devices comprise cellular communications devices.

13. A wireless communications system comprising:

a plurality of wireless local area network (WLAN) devices, each WLAN device having a device type associated therewith from among a plurality of different device types and having a unique identifier (UID) associated therewith, and each device type having a known latency histogram associated therewith; and a wireless device detector comprising at least one antenna and a transceiver connected thereto, and a controller for cooperating with said transceiver for transmitting a plurality of device finding signals to a target WLAN device from among said plurality of WLAN devices and for inserting the UID for the target WLAN device in each of the device finding signals;

said target WLAN device transmitting a respective reply signal for each of said device finding signals based upon the UID in the device finding signals;

said controller of said wireless device detector also for cooperating with said transceiver for receiving the reply signals, generating an observed latency histogram for said target WLAN device based upon the transmission of device finding signals and the received reply signals therefor, determining a propagation delay associated with said target WLAN device based upon a mathematical cross-correlation of the observed latency histogram and the known latency histogram of said target WLAN device, and estimating a range to said target WLAN device based upon the determined propagation delay.

14. The wireless communications system of claim 13 wherein the wireless device detector further comprises a profile database for storing respective known latency histograms associated with each of the plurality of different device types.

15. The wireless communications system of claim 13 wherein said controller determines the device type of the target wireless communications device based upon the observed latency histogram.

16. A wireless device detector for detecting a target wireless communications device, each wireless communications device having a unique identifier (UID) associated therewith, the wireless device detector comprising:

at least one antenna and a transceiver connected thereto; and a controller for cooperating with said transceiver for transmitting a plurality of device finding signals to the target wireless communications device, each device finding signal having the UID for the target wireless communications device inserted therein, and receiving a respective reply signal therefrom for each of said device finding signals based upon the UID in the device finding signals, generating an observed latency profile for said target wireless communications device based upon the transmission of device finding signals and the received reply signals therefor, determining a propagation delay associated with said target wireless communications device based upon the observed latency profile and a known latency profile of said target wireless communications device, and estimating a range to said target wireless communications device based upon the determined propagation delay.

17. The wireless device detector of claim 16 wherein the known latency profile and the observed latency profile comprise histograms; and wherein said controller determines the propagation delay based upon a mathematical cross-correlation of the respective histograms.

18. The wireless device detector of claim 16 further comprising a profile database for storing respective known latency profiles associated with a plurality of different device types.

19. The wireless device detector of claim 18 wherein said controller determines the device type of the target wireless communications device based upon the observed latency profile.

20. The wireless device detector of claim 16 further comprising a portable housing carrying said at least one antenna, said transceiver, and said controller.

21. A method for locating a target wireless communications device from among a plurality of wireless communications devices, each wireless communications device having a device type associated therewith from among a plurality of different device types and having a unique identifier (UID) associated therewith, and each device type having a known latency profile associated therewith, the method comprising:

transmitting a plurality of device finding signals to the target wireless communications device, inserting the UID for the target wireless communications device in each of the device finding signals, and receiving a respective reply signal for each of the device finding signals therefrom, the respective reply signal being based upon the UID in the device finding signals;

generating an observed latency profile for the target wireless communications device based upon the transmission of device finding signals and the received reply signals therefor;

determining a propagation delay associated with the target wireless communications device based upon the observed latency profile and a known latency profile of the target wireless communications device; and estimating a range to the target wireless communications device based upon the determined propagation delay.

22. The method of claim 21 wherein the known latency profile and the observed latency profile comprise histograms; and wherein the propagation delay is determined based upon the mathematical cross-correlation of the respective histograms.

23. The method of claim 21 further comprising storing respective known latency profiles associated with the plurality of different device types.

24. The method of claim 21 further comprising determining the device type of the target wireless communications device based upon the observed latency profile.

* * * * *